United States Patent [19]

Todo

[11] Patent Number: 5,070,981
[45] Date of Patent: Dec. 10, 1991

[54] FLUID COUPLING

[75] Inventor: Tamotsu Todo, Kanagawa, Japan

[73] Assignee: Atsugi Unisia Corporation, Kanagawa, Japan

[21] Appl. No.: 589,446

[22] Filed: Sep. 27, 1990

[30] Foreign Application Priority Data

Sep. 28, 1989 [JP] Japan .............................. 1-113830[U]
Oct. 24, 1989 [JP] Japan .............................. 1-123563[U]

[51] Int. Cl.$^5$ ............................................ F16D 31/00
[52] U.S. Cl. .................................. 192/58 B; 192/82 T
[58] Field of Search ........................... 192/58 B, 82 T; 123/41.12

[56] References Cited

U.S. PATENT DOCUMENTS 4,007,819 2/1977 Maci ................................... 192/58 B
4,683,999 8/1987 Light et al. ......................... 192/58 B

FOREIGN PATENT DOCUMENTS 59-34030 2/1984 Japan .................................. 192/58 B Primary Examiner—Allan D. Herrmann
Assistant Examiner—Andrea Pitts
Attorney, Agent, or Firm—Bachman & LaPointe

[57] ABSTRACT

A fluid coupling includes a valve unit for reducing working fluid introduced into a labyrinth-groove to adjust a ratio of a rotation speed of a cooling fan to that of an internal combustion engine, when the engine speed is rapidly increased. The valve unit comprises a through opening formed in one surface of a partition member which divides an internal space within a housing into two fluid chambers, and a valve plate pivotably supported on the surface of the partition member. The pivotal axis of the valve member is on a plane essentially same as that of the surface of the partition member. When no load is applied to the valve member, the valve member is positioned such that the through opening remains open, and, when force applied thereto by rotation of the housing becomes greater than a predetermined value, the valve member is moved so as to close the through opening.

36 Claims, 4 Drawing Sheets

FLUID COUPLING

BACKGROUND OF THE INVENTION

1. Field of the Invention

The present invention relates generally to a fluid coupling for transmitting torque from a driving member to a driven member via a fluid medium to cause the driven member to rotate. More specifically, the invention relates to a fluid coupling for transmitting rotation force from an internal combustion engine to a cooling fan.

2. Description of the Background Art

In water cooling type engines, air passing through a radiator causes heat to be radiated from cooling water. Therefore, the higher the flow rate of air passing through the radiator the better the heat radiating effect. When the vehicle is running at moderate or relatively high speeds, a sufficient amount of cooling air is forced against the front surface of the radiator. However, when the vehicular speed is low, or when the engine operates in the idling condition, the amount of cooling air is insufficient. In order that sufficient cooling air is introduced to the radiator in these cases, a cooling fan which rotates in accordance with rotation of the engine is arranged behind the radiator.

When rotation speed of the cooling fan becomes high, air resistance also becomes high, so that noise becomes great as well as the force required for rotating the fan. On the other hand, when the vehicular speed becomes high, the cooling fan does not need to draw so large an amount of air into the radiator since a large volume of air is forced against the front surface of the radiator due to air resistance to vehicle motion. For that reason, various systems have been proposed, which prevent the rotation speed of a cooling fan from increasing when the rotation speed reaches a certain value, or which cause a cooling fan to rotate only when it is required. Such systems include a fluid coupling, a fan clutch, a fan coupling and so forth.

Generally, a fluid coupling comprises a disc for receiving rotation force from an engine, and a wheel to which a cooling fan is attached. The wheel is designed to rotate in accordance with rotation of the disc via viscous resistance of silicone oil which passes through a labyrinth groove formed between circumferential surface portions of the disc and wheel. When rotation speed of the disc becomes greater than a predetermined value, the viscous resistance becomes insufficient relative to rotation speed of the disc, so that the rotation speed of the wheel does not become greater than a predetermined value.

The fan coupling has a fluid coupling which is combined with a bimetal thermostat, a sliding valve and so forth. The sliding valve is open and closed in accordance with expansion and contraction of the bimetal which expands and contracts in accordance with temperature, to adjust amount of working fluid introduced into a working chamber from a fluid storage chamber. The working fluid introduced into the working chamber is further introduced into a labyrinth groove, so that viscous resistance is produced between the disc and the wheel. In this way, the fan coupling causes the fluid coupling to operate in response to temperature of engine coolant.

In conventional fan couplings, there is a disadvantage in that, when the engine speed is rapidly increased from the engine idling condition, rotation speed of the cooling fan is rapidly increased which produces fan noise and causes power loss in the engine.

In order to overcome the aforementioned problems, Japanese Utility-Model First (unexamined) Publication (Jikkai Sho.) No. 60-58930 and (Jikkai Hei.) No. 1-131033 disclose improved fan couplings.

However, these disclosed systems have a relatively complicated valve mechanism which uses a spring or the like. Therefore, the construction thereof is not only complicated, but also many parts and high manufacturing accuracy are required. As a result, manufacturing becomes complicated, and manufacturing costs increase.

SUMMARY OF THE INVENTION

It is therefore a principal object of the present invention to provide a fluid coupling which can reduce rotation speed of a driven unit relative to that of a driving unit when the engine speed is rapidly increased.

It is another object of the present invention to provide a fluid coupling as above-mentioned which is simple in construction.

In order to accomplish the aforementioned and other objects, a fluid coupling includes a valve means for reducing working fluid passing through a viscous resistance generation portion, by which a driven unit rotates in response to rotation of a driving unit, to reduce rotation speed of the driven unit relative to that of the driving unit when the engine speed is rapidly increased.

According to one aspect of the present invention, a fluid coupling for transmitting rotation force from a driving unit to a driven unit, comprises:

a drive shaft connected to a driving unit to rotate by means of the driving unit;

a housing rotatably supported on the drive shaft and supporting thereon a driven unit, the housing defining therein an internal space;

dividing means for dividing the internal space into first and second fluid chambers;

a rotary member connected to the drive shaft to rotate together therewith and received within the second fluid chamber, the rotary member being cooperative with the housing to form a viscous resistance generating portion in the second fluid chamber, the viscous resistance generating portion receiving working fluid in the second fluid chamber for generating viscous resistance, by which the housing rotates in response to rotation of the rotary member; and valve means for allowing the working fluid in the first fluid chamber to be introduced into the second fluid chamber, to adjust amount of the working fluid passing through the viscous resistance generating portion for varying a ratio of rotation speed of the housing to that of the rotary member, the valve means including a through opening formed in one surface of the dividing means and a valve member pivotably supported on the surface, the pivotal direction of the valve member being essentially perpendicular to the plane of the surface of the dividing means, the valve member opening the through opening when no load is applied thereto and closing the through opening when force applied thereto by rotation of the housing becomes greater than a predetermined value.

According to another aspect of the present invention, a fluid coupling for transmitting rotation force from a driving unit to a driven unit, comprises:

a drive shaft connected to a driving unit to rotate by means of the driving unit;

a housing rotatably supported on the drive shaft and supporting thereon a driven unit, the housing defining therein an internal space;

dividing means for dividing the internal space into first and second fluid chambers, the dividing means including a major disc portion which extends essentially perpendicular to the rotation axis of the housing, and an annular flange portion which projects essentially parallel to the rotation axis of the housing from the circumferential edge of the major disc portion;

a rotary member connected to the drive shaft to rotate together therewith and received within the second fluid chamber, the rotary member being cooperative with the housing to form a viscous resistance generating portion in the second fluid chamber, the viscous resistance generating portion receiving working fluid in the second fluid chamber for generating viscous resistance, by which the housing rotates in response to rotation of the rotary member; and valve means, provided on the annular flange portion, for allowing the working fluid in the first fluid chamber to be introduced into the second fluid chamber, to adjust a volume of working fluid passing through the viscous resistance generating portion for varying a ratio of a rotation speed of the housing to that of the rotary member, the valve means being closed when force applied thereto by rotation of the housing becomes greater than a predetermined value so as to reduce the volume of working fluid passing through the viscous resistance generating portion.

According to further aspect of the present invention, a fluid coupling for transmitting rotation force from a driving unit to a driven unit, comprises:

a drive shaft connected to a driving unit to rotate by means of the driving unit;

a housing rotatably supported on the drive shaft and supporting thereon a driven unit, the housing defining therein an internal space;

dividing means for dividing the internal space into first and second fluid chambers, the dividing means including a major disc portion which extends essentially perpendicular to the rotation axis of the housing;

a rotary member connected to the drive shaft to rotate together therewith and received within the second fluid chamber, the rotary member being cooperative with the housing to form a viscous resistance generating portion in the second fluid chamber, the viscous resistance generating portion receiving working fluid in the second fluid chamber for generating viscous resistance, by which the housing rotates in response to rotation of the rotary member; and valve means, provided on the major disc portion, for allowing the working fluid in the first fluid chamber to be introduced into the second fluid chamber, to adjust a volume of working fluid passing through the viscous resistance generating portion for varying a ratio of a rotation speed of the housing to that of the rotary member, the valve means being closed when force applied thereto by rotation of the housing becomes greater than a predetermined value so as to reduce the amount of the working fluid passing through the viscous resistance generating portion.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

Figure 1:
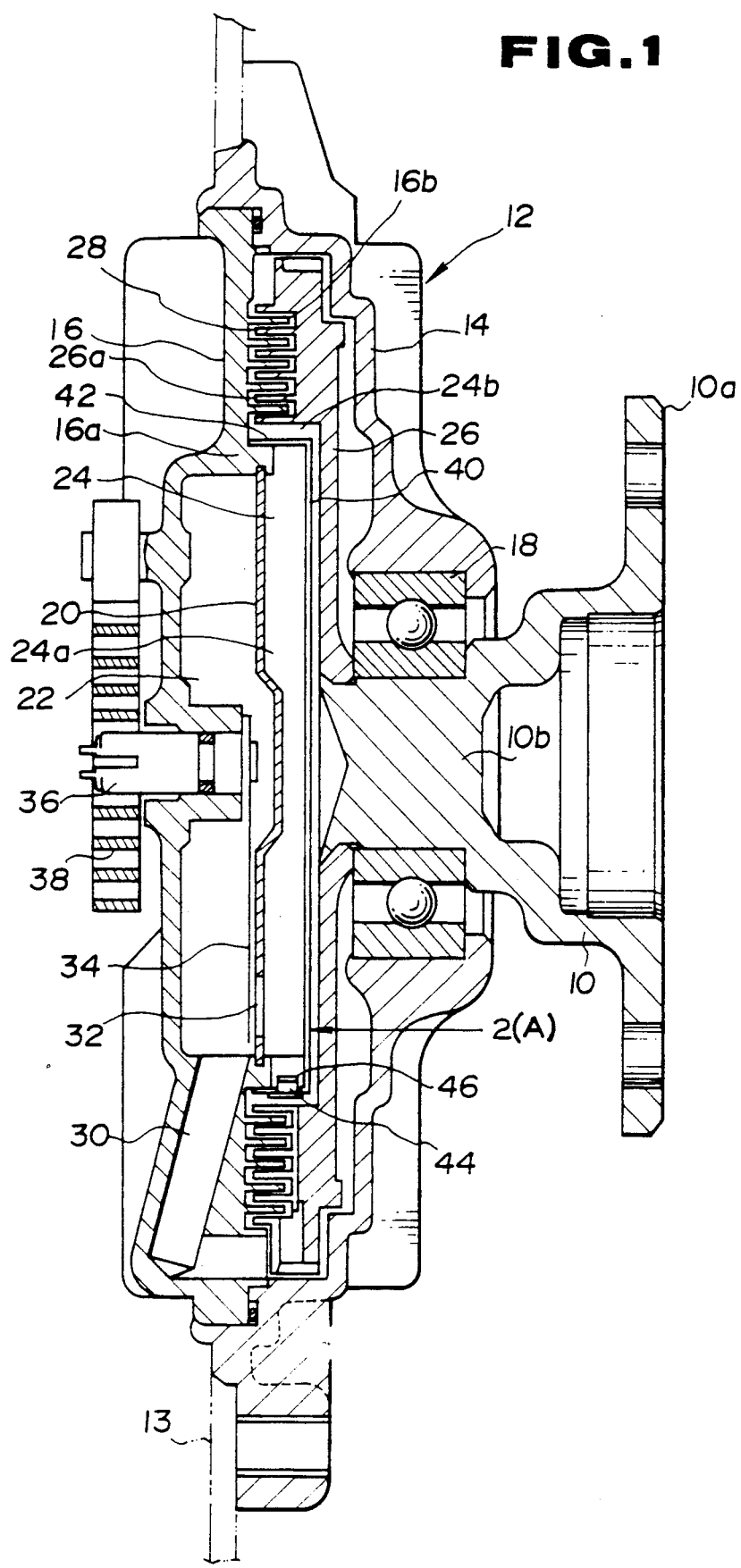
FIG. 1 is a sectional view of a fan coupling to which the first preferred embodiment of a fluid coupling, according to the present invention, is applied.
Figure 2A:
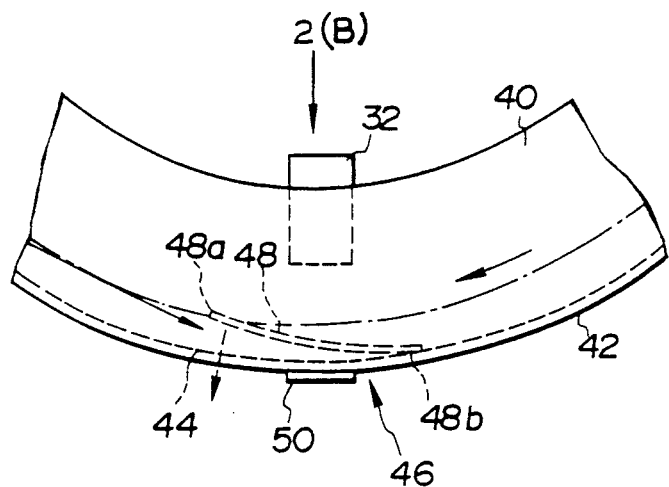
FIG. 2(A) is a plan view showing a valve mechanism used for the fan coupling of FIG. 1, which is viewed along the arrow 2(A) of FIG. 1.
Figure 2B:
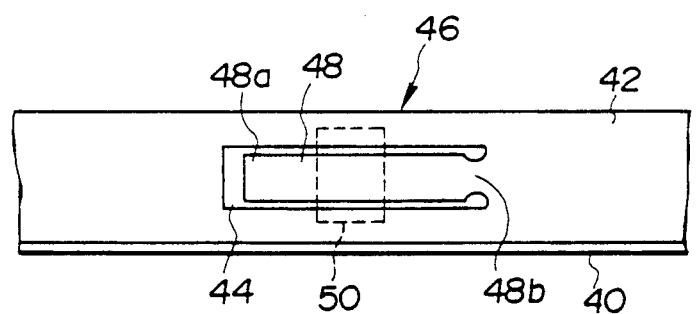
Figure 2C:
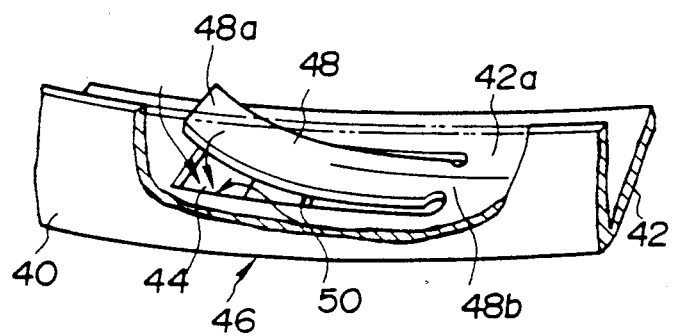
Figure 3:
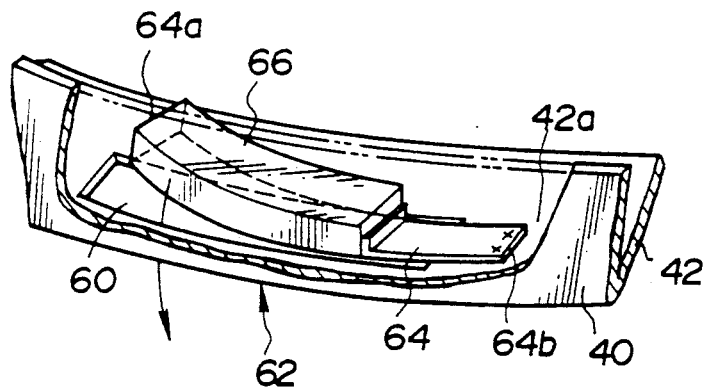
Figure 4:
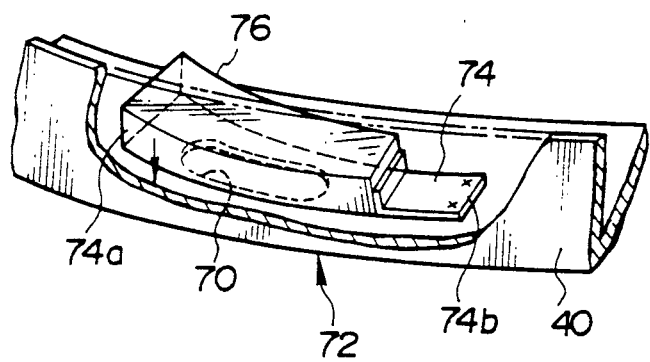
Figure 6:
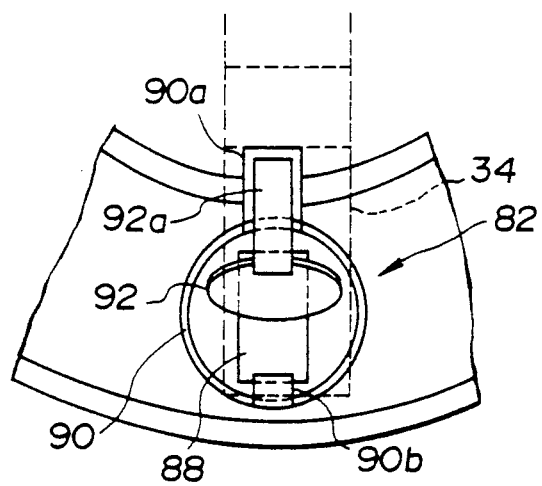
Figure 5:
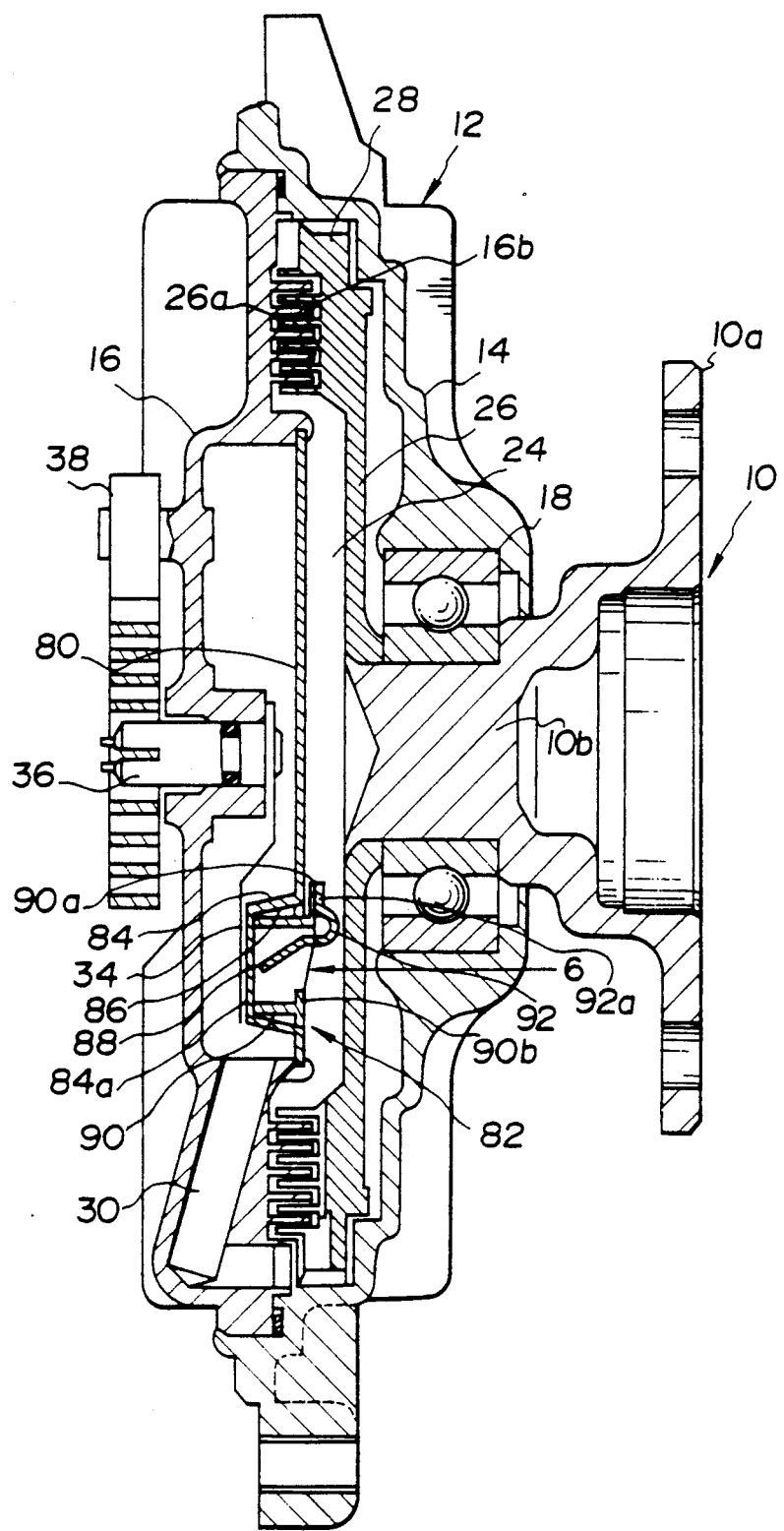

FIG. Z(B) is a plan view showing the valve mechanism of FIG. 2(A), which is viewed along the arrow 2(B) of FIG. 2(A);

FIG. 2(C) is a perspective view showing the valve mechanism of FIG. 2(A);

FIG. 3 is a perspective view showing the second preferred embodiment of a valve mechanism which is applied to the fan coupling of FIG. 1;

FIG. 4 is a perspective view showing the third preferred embodiment of a valve mechanism which is applied to the fan coupling of FIG. 1;

FIG. 5 is a sectional view of a fan coupling to which the fourth preferred embodiment of a fluid coupling, according to the present invention, is applied; and FIG. 6 is a plan view showing a valve mechanism used for the fan coupling of FIG. 5, which is viewed along the arrow 6 of FIG. 5.

DESCRIPTION OF THE PREFERRED EMBODIMENT

Referring now to the drawings, particularly to FIG. 1, there is shown a fan coupling to which the first preferred embodiment of a fluid coupling, according to the present invention, is applied.

As shown in FIG. 1, the fan coupling generally comprises a drive shaft 10 serving as an input means and a housing 12 serving as an output means for transmitting rotation force to a cooling fan 13 which is secured to the periphery of the housing 12. The drive shaft 10 is composed of a flange portion 10a and a shaft portion 10b. The housing 12 comprises a body member 14 and a wheel member 16. The flange portion 10a of the drive shaft 10 is secured to a V belt pulley arranged on the side of an internal combustion engine (not shown) to receive driving force from a crankshaft of the engine via the V belt pulley. The body member 14 of the housing 12 is rotatably supported on the shaft portion 10b of the drive shaft 10 via a bearing 18. The wheel member 16 of the housing 12 is secured to the body member 14 thereof such that the outer periphery of the wheel member 16 engages the circumferential inner surface of the body member 14 by way of a caulking, thereby a space is formed within the housing 12.

The wheel member 16 is integrally formed with an annular projecting portion 16a which projects inwardly from the inner surface of the wheel member 16 and which is concentric to the center thereof and spaced therefrom by a predetermined distance. This annular projecting portion 16a supports the periphery of a partition plate 20 by which the space formed within the housing 12 is divided into a storage chamber 22 and a working chamber 24.

The housing 12 receives a disc member 26 in the working chamber 24. The disc member 26 is secured to the end of the shaft portion 10b of the drive shaft 10 at the center thereof so as to receive rotation force from the engine via the drive shaft 10. The disc member 26 is integrally formed with a plurality of concentric annular projecting portions 26a which project from the circumferential surface portion of the disc member 26 toward the wheel member 16 and which are separated from each other at predetermined intervals. In addition, the wheel member 16 is integrally formed with a plurality of concentric annular projecting portions 16b which project from the circumferential surface portion of the wheel member 16 toward the disc member 26 and which are separated from each other at essentially the same intervals as that of the disc member 26. The distance between the adjoining annular projecting portions 26a of the disc member 26 is designed to be greater than the widths of the annular projecting portions 16b. The distance between the adjoining annular projecting portions 16b of the wheel member 16 are also designed to be greater than the widths of the annular projecting portions 26a. Therefore, when the annular projecting portions 26a or 16b of one of the disc member 26 and the wheel member 16 are inserted into groove formed between the other annular projecting portions 16b or 26a, there are spaces between the adjoining projecting portions 16b and 26a. The top ends of the projecting portions 26a of the disc member 26 are so arranged as to be separated from the bottoms of grooves formed between the projecting portions 16b of the wheel member 16 at a predetermined distance. On the other hand, the top ends of the projecting portions 16b of the wheel member 16 are also so arranged as to be separated from the bottoms of grooves formed between the projecting portions 26a of the disc member 26 at a predetermined distance. With this arrangement, a labyrinth groove 28 serving as a viscous resistance generating portion is formed between the circumferential surface portions of the disc member 26 and wheel member 16.

The wheel member 16 has a fluid passage 30 which establishes a fluid communication between the storage chamber 22 and the labyrinth groove 28 for returning working fluid passing through the labyrinth groove 28 to the storage chamber 22. In addition, the partition plate 20 has a through opening 32 which establishes a fluid communication between the storage chamber 22 and the working chamber 24. The through opening 32 is open and closed by means of a valve plate 34. One end of the valve plate 34 is connected to a rotary shaft 36 mounted on the wheel member 16 at essentially the center thereof. The rotary shaft 36 is also connected to the centrally located end portion of a spiral bimetal 38, the circumferentially located end portion of which is connected to a projection arranged on the outside of the wheel member 16, so that the valve plate 34 rotates in accordance with expansion and contraction of the spiral bimetal 38. As is well known, the bimetal is designed to expand and contract in accordance with temperature. Therefore, the valve plate 34 opens and closes the through opening 32 in accordance with variation of temperature.

An essentially disc-shaped bulkhead 40 is arranged between the partition plate 20 and the disc member 26. The bulkhead 40 is integrally formed with a ring-shaped flange portion 42 which extends vertically from the circumferential edge of the bulkhead 40. The circumferential edge of the flange portion 42 is secured to the outside wall of the projecting portion 16a of the wheel member 16, so that the working chamber 24 is divided into a first fluid chamber 24a formed between the partition plate 20 and the bulkhead 40, and a second fluid chamber 24b in which the labyrinth groove 28 is arranged.

As can be seen clearly from FIGS. 2(A) to 2(C), an essentially rectangular through opening 44 extending in a circumferential direction of the flange portion 42 is formed in the flange portion 42. The through opening 44 is designed to be open and closed by means of a valve mechanism 46. The valve mechanism 46 comprises an essentially rectangular valve member 48 and a stopper piece 50. The valve member 48 and the through opening 44 are simultaneously formed by way of the stamping. The stopper piece 50 extends so as to traverse the through opening 44, and the both end portions thereof are secured to the flange portion 42. The stopper piece 50 serves to prevent the valve member 48 from distorting outwards to exceed the maximum distorting position. The valve member 48 is formed so that the direction from the free end portion 48a to the fixed end portion 48b is the same as the direction of rotation of the housing 12. The valve member 48 is distorted inwardly so as to open the through opening 44 when no load is applied thereto. When the housing 12 rotates at rapid acceleration, centrifugal and inertial forces are applied to the working fluid in the first fluid chamber 24a, so that the valve member 48 is designed to deform toward its closed position by the working fluid to which the centrifugal and inertial forces are applied. In addition, the fixed end portion 48b is formed with a pair of cut-out portions establishing suitable elastic force of the valve member, which is biased to assume a position which is bent inward of the circumference of the flange 42, as shown in FIG. 2(c).

With this construction, the operation of the first preferred embodiment of a fluid coupling, according to the present invention, is described below.

Torque transmitted from the disc member 26, which rotates with the drive shaft 10 serving as the input means, to the housing 12 serving as the output means, may be expressed as a function of the flow rate of the working fluid in the working chamber 24. That is, when only slight working fluid exists in the labyrinth groove 28, the difference between rotation speeds of the input means 10 and the output means 12 is maximum, and as the amount of the working fluid increases, the difference decreases.

In a case where the engine performs usual operation after warming up, the valve plate 34 opens the though opening 32, so that the working fluid in the storage chamber 22 is introduced into the first fluid chamber 24a. When working fluid is present in the labyrinth groove 28, torque is transmitted from the disc member 26 to the housing 12 by means of viscous resistance caused by the working fluid passing though the labyrinth groove 28, so that the housing 12 rotates according to rotation of the disc member 26. When the housing 12 rotates, centrifugal force is applied to the working fluid in the first fluid chamber 24a so that thrusting force is applied to the valve member 48 of the valve mechanism 46. In this case, the thrusting force is less than the elastic force of the valve member 48 itself, so that the valve member 48 remains to open the through opening 44. Therefore, the working fluid in the first fluid chamber 24a passes through the through opening 44 as shown by the arrows of FIG. 2(C) to be rapidly introduced into the second fluid chamber 24b. The working fluid introduced into the second fluid chamber 24b is further introduced into the labyrinth groove 28, so that torque continues to be transmitted from the disc member 26 to the housing 12 by means of viscous resistance caused by the working fluid passing though the labyrinth groove 28. In this way, the cooling fan 13 may obtain usual rotation force.

On the other hand, in a case where the engine speed is rapidly accelerated from an engine idling condition, the rotation speed of the drive shaft 10 rapidly increases, which temporarily causes rapid increase in the rotation of the housing 12 due to working fluid remaining in the labyrinth groove 28. In this case, centrifugal force is not only applied to the working fluid in the first fluid chamber 24a, but inertial force is also applied to the working fluid along the inner surface 42a of the flange portion 42 of the bulkhead 40, therefore, a composite force composed of the centrifugal and inertial forces causes the valve member 48 to deform outwardly against its own elastic force until the valve member 48 comes into contact with the stopper piece 50 to close the through opening 44. In this way, fluid communication between the first and second fluid chambers 24a and 24b is blocked, so that the amount of the working fluid introduced into the labyrinth groove 28 is decreased. Therefore, it is possible to prevent the rotation speed of the cooling fan 13 from excessively increasing, that is, so-called "overshooting" of the cooling fan 13 can be prevented when the engine speed is rapidly increased from an engine idling condition.

As mentioned above, in this embodiment, "overshooting" of the cooling fan 13 can be prevented when the engine is rapidly accelerated. In addition, the construction of the valve mechanism 46 is very simple, and the number of parts thereof is less than that of conventional valve mechanisms. Specifically, since the valve member 48 may be formed by only stamping out the flange portion 42, the process for manufacturing the valve mechanism 46 becomes very easy. In addition, since the elastic force of the valve member 48 may be adjusted by changing the width and length of the fixed end portion 48b, it can be applied to different sizes of fluid couplings and so forth.

Fig. 3 shows the second preferred embodiment of a valve mechanism which can be applied to a fluid coupling, according to the present invention. In this embodiment, an essentially rectangular through opening 60 is formed in the flange portion 42, and a valve member 64 of a valve mechanism 62 is not integrated with the flange portion 42. The valve member 64 has a curved rectangular shape, and the bottom area thereof is less than open area of the through opening 60. One end portion 64b of the valve member 64 is secured to the flange portion 42 at a location neighboring the through opening 60 by way of welding, so that the direction from the free end portion 64a to the fixed end portion 64b is same as that of rotation of the housing 12. The valve member 64 is integrally formed with a thick weight portion 66.

In this embodiment, the same effect as that of the first preferred embodiment can be obtained. In addition, since the weight of the valve member 64 and the area of the valve member 64 which is interfered with the working fluid are increased, the valve member 64 can deform outwardly i.e. toward its closed position, relatively easily. Furthermore, the valve member 64 and the weight portion 66 can deform so that the free end portion 64a passes through the through opening 60.

FIG. 4 shows the third preferred embodiment of a valve mechanism which can be applied to a fluid coupling according to the present invention. In this embodiment, the construction is basically same as that of the second preferred embodiment except that the bottom areas of a valve member 74 and a weight portion 76 of a valve mechanism 72 are greater than open area of a through opening 70 formed in the flange portion 42. The valve member 74 and the weight portion 76 have a sector-shaped cross-section, so that the free end portion 74a is greater than the fixed end portion 74b. Therefore, when the valve member 74 deforms outwardly, the circumference surface portion of the valve member 74 comes into contact with the flange portion 42 around the through opening 70, so that essentially perfect blocking of the fluid communication between the first and second fluid chambers 24a and 24b can be performed. Therefore, the rotation of the cooling fan 13 can be surely stopped.

FIG. 5 shows a fan coupling to which the fourth preferred embodiment of a fluid coupling, according to the present invention, is applied. The construction of this embodiment is essentially similar to that of the first preferred embodiment except that the bulkhead 40 for dividing the working chamber 24 into the first and second fluid chamber 24a and 24b is not used, and that a partition plate 80 and a check valve 82 are substituted for the partition plate 20 and the valve mechanism 46, respectively. The partition plate 80 has an essentially cylindrical projecting portion 84 which projects toward the storage chamber 22. The projecting portion 84 serves to define a valve receiving portion 86 on the side of the working chamber 24. the top surface 84a of the projecting portion 84 has an essentially rectangular through opening 88 which is open and closed by means of the valve plate 34. The valve receiving portion 86 receives the check valve 82 therein. As can be seen clearly from FIG. 6, the check valve 82 generally comprises a cylindrical body member 90 and a disc-shaped valve plate 92. The body member 90 has a mounting piece 90a which extends from the periphery of the body member 90 toward the central point of the partition plate 80 in parallel to the partition plate 80. The valve plate 92 is supported on the mounting piece 90a of the body member 90 via an elastic leg portion 92a. When no load is applied to the valve plate 92, it is biased to be inclined in an open position. In addition, the body member 90 has a stopper piece 90b which extends inwardly from the periphery of the body member 90 at a location opposing to the mounting piece 90a in parallel to the partition plate 80. In this embodiment, the interior and exterior of the check valve 82 may serve as the first and second fluid chambers 24a and 24b, respectively.

With this construction, the operation of the fourth preferred embodiment of a fluid coupling, according to the present invention, is described below.

In a case where the engine performs usual operation after warming up, the valve plate 34 opens the through opening 88, so that the working fluid in the storage chamber 32 is introduced into the interior of the check valve 82. Torque is transmitted from the disc member 26 to the housing 12 by means of viscous resistance caused by the working fluid passing through the labyrinth groove 28, so that the housing rotates according to rotation of the disc member 26. When the housing 12 rotates, centrifugal force is applied to the working fluid in the check valve 82, so that thrusting force is applied to the valve plate 92 of the check valve 82. In this case, the thrusting force is less than the elastic force of the leg portion 92a of the valve plate 92, so that the valve plate 92 remains opened. Therefore, the working fluid in the check valve is introduced into the working chamber 24. The working fluid introduced into the working chamber 24 is further introduced into the labyrinth groove 28, so that torque continues to be transmitted from the disc member 26 to the housing 12 by means of viscous resistance caused by the working fluid passing though the labyrinth groove 28. In this way, the cooling fan 13 may obtain usual rotation force.

On the other hand, in a case where the engine speed is rapidly accelerated from the engine idling condition, rotation speed of the drive shaft 10 is rapidly increased, which causes temporary, rapid increase in the rotation speed of the housing 12 due to the working fluid remaining in the labyrinth groove 28. In this case, centrifugal force applied to the working fluid in the check valve 82 becomes greater than the elastic force of the leg portion 92a of the valve plate 92 itself. Therefore, the leg portion 92a of the valve plate 92 deforms against the reaction force itself so that the valve plate 92 is closed. In this way, the fluid communication between the storage chamber 22 and the working chamber 24 is blocked, so that the amount of working fluid introduced into the labyrinth groove 28 is decreased. Therefore, it is possible to prevent the rotation speed of the cooling fan 13 from excessively increasing, that is, "overshooting" of the cooling fan 13 can be prevented when the engine speed is rapidly increased. As a result, though the engine speed rapidly increased, it is possible to decrease noise caused by the cooling fan 13 as well as engine power loss.

While the present invention has been disclosed in terms of the preferred embodiment in order to facilitate better understanding thereof, it should be appreciated that the invention can be embodied in various ways without departing from the principle of the invention. Therefore the invention should be understood to include all possible embodiments and modification to the shown embodiments which can be embodied without departing from the principle of the invention as set forth in the appended claims.

What is claimed is:

1. A fluid coupling for transmitting rotation force to a driven unit, said fluid coupling comprising:
   a drive shaft;
   a housing rotatably supported on said drive shaft and supporting thereon a driven unit, said housing defining therein an internal space;
   dividing means for dividing said internal space into first and second fluid chambers;
   a rotary member connected to said drive shaft to rotate together therewith and received within said second fluid chamber, said rotary member being cooperative with said housing to form a viscous resistance generating portion in said second fluid chamber, said viscous resistance generating portion receiving working fluid in said second fluid chamber for generating viscous resistance, by which said housing rotates in response to rotation of said rotary member; and
   valve means for allowing the working fluid in said first fluid chamber to be introduced into said second fluid chamber, to adjust amount of the working fluid passing through said viscous resistance generating portion for varying a ratio of rotation speed of said housing to that of said rotary member, said valve means including a through opening formed in one surface of said dividing means and a valve member pivotably supported on said surface, the pivotal direction of said valve member being essentially perpendicular to said surface, said valve member opening said through opening when no load is applied thereto and closing said through opening when force applied thereto by rotation of said housing becomes greater than a predetermiend value.

2. A fluid coupling as set forth in claim 1, wherein said valve member is so arranged as to be distorted toward rotation axis of said housing when no load is applied thereto.

3. A fluid coupling as set forth in claim 2, wherein an open area of said through opening is greater than an area which is closed by said valve member.

4. A fluid coupling as set forth in claim 3, wherein said valve member is integrally formed with said dviding means.

5. A fluid coupling as set forth in claim 4, wherein said valve means includes a stopper member which prevents said valve member from distorting such as to pass through said through opening.

6. A fluid coupling as set forth in claim 4, including a support portion by which the valve member is supported on said dividing means.

7. A fluid coupling as set forth in claim 6, wherein the shape of said through opening and said valve member are essentially rectangular.

8. A fluid coupling as set forth in claim 7, wherein said support portion has cut-out portions so that the width of the support portion is less than that of a main portion of said valve member.

9. A fluid coupling as set forth in claim 3, wherein said vlave member comprises an elongated plate, one end of which is secured to said dividing means and the other end of which is movable in a radial direction of said housing, and a weight member arranged on said elongated plate.

10. A fluid coupling as set forth in claim 9, wherein said weight member is integrally formed with said elongated plate.

11. A fluid coupling as set forth in claim 2, wherein open area of said through opening is smaller than an area of said valve member which faces said surface of said dividing means.

12. A fluid coupling as set forth in claim 1, wherein said valve member comprises an elongated plate having an essentially sector-shaped cross section and a weight member arranged on said elongated plate, one end of said elongated plate being secured to said dividing means and the other end thereof being movable in a radial direction of said housing.

13. A fluid coupling as set forth in claim 12, wherein said weight member is integrally formed with said elongated plate.

14. A fluid coupling as set set forth in claim 1, wherein said valve means includes an elastic supporting member by which said valve member is supported on said surface of the dividing means.

15. A fluid coupling as set forth in claim 14, wherein said elastic supporting member is formed so as to position a free end of said valve member away from said surface of said dividing means when no load is applied thereto.

16. A fluid coupling as set forth in claim 15, wherein said through opening and said valve member are essentially circular, the diameter of said through opening being greater than that of said valve member, and wherein said valve means includes a stopper member which prevents said valve member from passing through said through opening.

17. A fluid coupling as set forth in claim 1, wherein said viscous resistance generating portion is a labyrinth groove formed between said rotary member and said housimg.

18. A fluid coupling as set forth in claim 2 wherein said valve member opens said through opening while force applied thereto by rotation of said housing is less than an elastic force of said valve member itself.

19. A fluid coupling for transmitting rotation force to a driven unit, said fluid coupling comprising:
   a drive shaft;
   a housing rotatably supported on said drive shaft and supporting thereon a driven unit, said housing defining therein an internal space;
   dividing means for dividing said internal space into first and second fluid chamber, said divding means including a major disc portion which extends essentially perpendicular to the rotation axis of said housing, and an annular flange portion which projects essentially parallel to the rotation axis of said housing from the circumferential edge of the major disc portion;
   a rotary member connected to said drive shaft to rotate together therewith and received within said second fluid chamber, said rotary member being cooperative with said housing to form a viscous resistance generating portion in said second fluid chamber, said viscous resistance generating portion receiving working fluid in said second fluid chamber for generating viscous resistance, by which said housing rotates in response to rotation of said rotary member; and
   valve means, provided on said annular flange portion, for allowing the working fluid in said first fluid chamber to be introduced into said second fluid chamber, to adjust a volume of working fluid passing through said viscous resistance generating portion for varying a ratio of a rotation speed of said housing to that of said rotary member, said valve means being closed when force applied thereto by rotation of said housing becomes greater than a predetermined value so as to reduce the volume of working fluid passing through said viscous resistance generating portion.

20. A fluid coupling as set forth in claim 19, wherein said valve means includes a through opening formed in said annular flange portion, and a valve member pivotably supported on said annular flange portion.

21. A fluid coupling as set forth in claim 20, wherein said valve member is movable between a fully open position in which said valve member is so arranged as to be distorted toward the center of said major disc portion, and a fully closed position in which said valve member is so arranged as to be on a plane substantially that of said through opening formed in said annular flange portion, said valve member being positioned at said fully open position when no load is applied to the valve member, and at said fully closed position when force applied thereto by rotation of said housing becomes greater than a predetermined value.

22. A fluid coupling as set forth in claim 21, wherein an open area of said through opening is greater than an area which is closed by said valve member.

23. A fluid coupling as set forth in claim 22, wherein said valve member is integrally formed with said annular flange portion.

24. A fluid coupling as set forth in claim 23, said valve means includes a stopper member which prevents said valve member from distorting such as to pass through said through opening.

25. A fluid coupling as set forth in claim 23, including a support portion by which the valve member is supported on said dividing means.

26. A fluid coupling as set forth in claim 25, wherein the shape of said through opening and said valve member are essentially rectangular.

27. A fluid coupling as set forth in claim 26, wherein said support portion has cut-out portions so that the width of the support portion is less than that of a main portion of said valve member.

28. A fluid coupling as set forth in claim 22, wherein said valve member comprises an elongated plate, one end of which is secured to said annular flange portion and the other end of which is movable in a radial direction of said major disc portion of the dividing means, and a weight member arranged on said elongated plate.

29. A fluid coupling as set forth in claim 28, wherein said weight member is integrally formed which said elongated plate.

30. A fluid coupling as set forth in claim 21, wherein open area of said through opening is smaller than an area of said valve member which faces said annular flange portion.

31. A fluid coupling as set forth in claim 30, wherein sid valve member comprises an elongated plate having an essentially sector-shaped cross section and a weight member arranged on said elongated plate one end of said elongated plate being secured to said annular flange portion and the other end thereof being movable in a radial direction of said major disc portion of the dividing means.

32. A fluid coupling as set forth in claim 31, wherein said wegith member is integrally formed with said elongated plate.

33. A fluid coupling for transmitting rotation force to a driven unit, said coupling comprisng:
   a drive shaft;
   a housing rotatably supported on said drive shaft and supporting thereon a driven unit, said housing defining therein an internal space;
   dividing means for dividing said internal space into first and second fluid chambers, said dividing means including a major disc portion which extends essentially perpendicular to the rotation axis of said housing;
   a rotary member connected to said drive shaft to rotate together therewith and received within said second fluid chamber, said rotary member being cooperative with said housing to form a viscous resistance generating portion in said second fluid chamber, said viscous resistance generating portion receiving working fluid in said second fluid chamber for generatng viscous resistance, by which said housing rotates in response to rotation of said rotary member; and
   valve means, provided on said major disc portion, for allowing the working fluid in said first fluid chamber to be introduced into said second fluid chamber, to adjust a volume of working fluid passing through said viscous resistance generating portion for varying a ratio of a rotation speed of said housing to that of said rotary member, said valve means being closed when force applied thereto by rotation of said housing becomes greater than a predetermined value so as to reduce the amount of the working fluid passing through said viscous resistance generating portion.

34. A fluid coupling as set forth in claim 33, wherein said valve means includes an elastic supporting member by which said valve member is supported on said major disc portion of the dividing means.

35. A fluid coupling as set forth in claim 34, wherein said elastic supporting member is formed so as to position a free end of said valve member away from said surface of said dividing means when no load is applied thereto.

36. A fluid coupling as set forth in claim 35, wherein said through opening and said valve member are essentially circular, the diameter or said through opening being greater than that of said valve member, and wherein said valve means includes a stopper member which prevents said valve member from passing through said through opening.

* * * * *

UNITED STATES PATENT AND TRADEMARK OFFICE
CERTIFICATE OF CORRECTION

PATENT NO. : 5,070,981

DATED : December 10, 1991

INVENTOR(S) : Tamotsu Todo

It is certified that error appears in the above-identified patent and that said Letters Patent is hereby corrected as shown below:

In Column 5, line 21, "groove" should read --grooves--.

In Column 10, claim 1, line 6, "predetermiend" should read --predetermined--

In Column 10, claim 2, line 10, after "toward" --the-- should be inserted.

In Column 10, claim 4, lines 16-17, "dviding" should read --dividing--.

In Column 10, claim 9, line 33, "vlave" should read --valve--.

In Column 10, claim 12, line 45, "claim 1" should read --claim 11--.

In Column 10, claim 14, line 55, after "as set" "set" should be deleted.

In Column 11, claim 17, line 6, "housimg" should read --housing--.

In Column 11, claim 19, line 18, "chamber" should read --chambers--.

UNITED STATES PATENT AND TRADEMARK OFFICE
CERTIFICATE OF CORRECTION

PATENT NO. : 5,070,981

DATED : December 10, 1991

INVENTOR(S) : Tamotsu Todo

It is certified that error appears in the above-identified patent and that said Letters Patent is hereby corrected as shown below:

In Column 12, claim 32, line 37, "wegith" should read --weight--.

In Column 12, claim 33, line 40, after "said" --fluid-- should be inserted and after "coupling" "comprisng" should be changed to --comprising--.

Signed and Sealed this

Thirtieth Day of March, 1993

*Attest:*

STEPHEN G. KUNIN

*Attesting Officer*     *Acting Commissioner of Patents and Trademarks*